United States Patent
Cao et al.

(10) Patent No.: US 11,322,807 B2
(45) Date of Patent: May 3, 2022

(54) ELECTRODE PLATE AND BATTERY CELL OF WOUND LITHIUM-ION BATTERY AND METHOD FOR MANUFACTURING SAME

(71) Applicants: Ruipu Energy Co., Ltd., Wenzhou (CN); Shanghai Ruipu Energy Co., Ltd., Shanghai (CN)

(72) Inventors: Hui Cao, Zhejiang (CN); Min Hou, Shanghai (CN); Chan Liu, Shanghai (CN); Zhaoyu Yu, Zhejiang (CN); Si Liu, Shanghai (CN); Wei Liu, Shanghai (CN); Sen Jiang, Zhejiang (CN)

(73) Assignees: Ruipu Energy Co., Ltd., Zhejiang (CN); Shanghai Ruipu Energy Co., Ltd., Shanghai (CN)

( * ) Notice: Subject to any disclaimer, the term of this patent is extended or adjusted under 35 U.S.C. 154(b) by 0 days.

(21) Appl. No.: 16/649,622

(22) PCT Filed: Feb. 28, 2019

(86) PCT No.: PCT/CN2019/076424
§ 371 (c)(1),
(2) Date: Mar. 20, 2020

(87) PCT Pub. No.: WO2020/015362
PCT Pub. Date: Jan. 23, 2020

(65) Prior Publication Data
US 2021/0376427 A1    Dec. 2, 2021

(30) Foreign Application Priority Data

Jul. 20, 2018  (CN) .......................... 201810806185.3
Jul. 20, 2018  (CN) .......................... 201821155582.0
Jul. 20, 2018  (CN) .......................... 201821157398.X

(51) Int. Cl.
*H01M 4/139* (2010.01)
*H01M 10/0525* (2010.01)
(Continued)

(52) U.S. Cl.
CPC ......... *H01M 50/538* (2021.01); *H01M 4/139* (2013.01); *H01M 10/0525* (2013.01);
(Continued)

(58) Field of Classification Search
None
See application file for complete search history.

(56) References Cited

U.S. PATENT DOCUMENTS

2010/0124694 A1  5/2010  Hikata
2017/0092926 A1*  3/2017  Doo ................... H01M 50/531

FOREIGN PATENT DOCUMENTS

CN  101714624 A  5/2010
CN  102569721 A  7/2012
(Continued)

OTHER PUBLICATIONS

CN 102569721 English translation. Xu et al. China. Jul. 11, 2012. (Year: 2012).*
(Continued)

*Primary Examiner* — Christopher P Domone
(74) *Attorney, Agent, or Firm* — Quarles & Brady LLP

(57) ABSTRACT

Provided are an electrode plate and a battery cell of a wound lithium-ion battery and a method for manufacturing same. The electrode plate comprises an electrode plate body and at least two groups of tabs arranged on the electrode plate body, with each group of tabs including multiple tabs, wherein the multiple tabs have equal intervals therebetween, and the widths of the multiple tabs are successively increased by 2πΔt, with Δt being the sum of the thicknesses of a positive electrode plate, a negative electrode plate and
(Continued)

two layers of a separation film of the battery cell of the lithium-ion battery. The present invention can avoid the problem in the prior art of burrs on an electrode plate due to secondary die-cutting, and can reduce the possibility of self-discharge of the battery. Since the body of each tab is completely coated with an electrode material, the energy density is high, thereby improving the safety of the battery. By means of slightly adjusting the widths of the tabs, continuous production is realized.

24 Claims, 11 Drawing Sheets

(51) Int. Cl.
*H01M 10/0587* (2010.01)
*H01M 50/538* (2021.01)
*H01M 10/42* (2006.01)
*H01M 50/528* (2021.01)
*H01M 50/533* (2021.01)

(52) U.S. Cl.
CPC ... *H01M 10/0587* (2013.01); *H01M 10/4235* (2013.01); *H01M 50/528* (2021.01); *H01M 50/533* (2021.01)

(56) References Cited

FOREIGN PATENT DOCUMENTS

| CN | 106058137 A | 10/2016 |
|----|----|----|
| CN | 108461811 A | 8/2018 |
| CN | 207765536 U | 8/2018 |
| JP | 2004178832 A | 6/2004 |
| WO | 2016076109 A1 | 5/2016 |

OTHER PUBLICATIONS

PCT International Search Report and Written Opinion, PCT/CN2019/076424, dated May 7, 2019, 10 pages [Includes English Language Translation of the International Search Report].

Japan Patent Office. Notification for Reasons for Refusal for application 2020-543688, dated Apr. 26, 2021. With translation. 10 pages.

* cited by examiner

ELECTRODE PLATE AND BATTERY CELL OF WOUND LITHIUM-ION BATTERY AND METHOD FOR MANUFACTURING SAME

CROSS-REFERENCE TO RELATED APPLICATIONS

This application represents the U.S. national stage entry of International Application No. PCT/CN2019/076424 filed Feb. 28, 2019, which claims priority to Chinese Patent Application No. 201821157398.X filed Jul. 20, 2018, No. 201810806185.3 filed Jul. 20, 2018, and No. 201821155582.0 filed Jul. 20, 2018, the disclosure of which is incorporated herein by reference in its entirety and for all purposes.

FIELD OF THE INVENTION

The present invention relates to the field of lithium-ion batteries, and particularly relates to an electrode plate and a cell of a wound lithium-ion battery and a manufacturing method thereof.

BACKGROUND

In the field of lithium-ion batteries, there are two types of method for producing cells in the prior art: laminating and winding. Among them, the wound method can obtain better battery performance and higher production efficiency. The structure of an electrode plate of a wound battery with multi-tab has higher energy density and production efficiency than the structure with full-tab. Therefore, the industry tends to use the winding method for production and the structure of the electrode plate with multi-tab. However, in the process of winding the electrode plate, the perimeter of each turn of the electrode plate gradually increases. In order to ensure the tabs are aligned, the interval between the tabs needs to be increased with the number of turns. The interval between the tabs is usually formed by die-cutting of a metal cutting die, and the interval formed by one die-cutting is equal to the length of the metal cutting die. As the length of metal cutting die cannot be changed with the increase of the interval, two times of die-cutting is used to form the tabs and their interval. Although this meets the needs of increasing interval between the tabs, it brings new problems. Firstly, when the die is cut twice, the two die cuts cannot be precisely aligned due to the vibration of the metal cutting die, which will cause a step on the electrode plate and lead to sharp burrs, thereby increasing the battery's self-discharge or even short circuit, which poses safety hazards. Secondly, in order to eliminate this effect, a layer of ceramic material is generally coated on the edge of the electrode plate by die-cutting for insulation, which causes an increase in cost and reduces the energy density of the battery.

FIG. 1 is a schematic structure diagram of an electrode plate for a wound lithium-ion battery in the prior art. Referring to FIG. 1, the electrode plate 1 comprises an electrode plate body 10 and a plurality of protruding tabs 11 thereon. As a result of two times of die-cutting, a step 12 is formed at the connecting position between the tab 11 and the electrode plate body 10. Active material is coated on the electrode plate body 10. In order to eliminate the effect of battery self-discharge caused by step 12, a layer of ceramic material is coated on the connecting position between the tab 11 and the electrode plate body 10 for insulation, thereby increasing the complexity of the process.

Therefore, it is necessary to propose a structure of an electrode plate that uses a winding method and can avoid the problems caused by two die-cutting, and a cell and a lithium-ion battery which are formed by such electrode plate.

SUMMARY

The technical problem to be solved by the present invention is to provide an electrode plate and a cell for a wound lithium-ion battery and a manufacturing method thereof, which can avoid the problem of steps caused by the two times of die-cutting in cutting area in the prior art, thereby greatly reducing the self-discharge rate for the battery.

To solve the above technical problem, the present invention provides an electrode plate for a wound lithium-ion battery, comprising: an electrode plate body and at least two groups of tabs which are set on the electrode plate body, wherein each group has a plurality of tabs, wherein an interval between the plurality of tabs is equal, wherein widths of the plurality of tabs are sequentially increased by $2\pi\Delta t$, and wherein $\Delta t$ is a sum of thicknesses of a positive electrode plate, a negative electrode plate and two layers of a separator of a cell of the lithium-ion battery.

Optionally, an interval between adjacent tabs in any first group of tabs from the at least two groups of tabs is equal to an interval between adjacent tabs in a second group of tabs from the at least two groups of tabs.

Optionally, an interval between adjacent tabs in any first group of tabs from the at least two groups of tabs is not equal to an interval between adjacent tabs in a second group of tabs from the at least two groups of tabs.

Optionally, a surface of the electrode plate is completely coated with an active material.

Optionally, a numerical number of tabs in each group of tabs in the at least two groups of tabs is 3-36.

Optionally, an interval between adjacent tabs in each group of the at least two groups of tabs is 10 mm~400 mm.

Optionally, a width of a last tab in the at least two groups of tabs is equal to a width of a third tab from the last tab in the at least two groups.

Optionally, a width of a last tab, which is adjacent to a next group of tabs, in each group of tabs is equal to a width of a third tab from the last tab in this group.

To solve the above technical problem, the present invention further provides a cell wound by the electrode plate according to the above, comprising: a cell body and two electrodes, wherein the cell body is wound by the electrode plate body, and wherein each of the electrode is formed by sequentially stacking the at least two groups of tabs of each of the electrode plate.

Optionally, a width of each tab of each group of tabs in each electrode is sequentially increased from the inner ring to the outer ring of the cell body.

Optionally, the cell comprises a positive electrode plate and a negative electrode plate, wherein the cell body comprises the electrode plate bodies of the positive electrode plate and the negative electrode plate, and wherein at least two groups of tabs of the positive electrode plate and at least two groups of tabs of the negative electrode plate are stacked separately to form one electrode.

Optionally, the cell further comprises two layers of a separator stacked between the positive electrode plate and the negative electrode plate.

To solve the above technical problem, the present invention further provides a method of manufacturing the electrode plate according to the above, wherein at least two cutting dies are used for die-cutting the electrode plate body to obtain the at least two groups of tabs, and wherein a length of each cutting die is equal to an interval between two adjacent tabs in a corresponding group of tabs.

To solve the above technical problem, the present invention further provides an electrode plate for a wound lithium-ion battery, comprising: an electrode plate body and at least one group of tabs which is set on the electrode plate body, wherein each group has a plurality of tab pairs, wherein widths of two tabs of each tab pair in the plurality of tab pairs are equal, wherein an interval between two tabs in each tab pair is equal, wherein an interval between each tab pair is equal and widths of the tabs are sequentially increased by $\pi\Delta t$, and wherein $\Delta t$ is a sum of thicknesses of a positive electrode plate, a negative electrode plate and two layers of a separator of a cell of the lithium-ion battery.

Optionally, an interval L1 between two tabs in each tab pair is 5 mm≤L1≤1280 mm.

Optionally, an interval L2 between each tab pair is 5 mm≤L2≤280 mm.

Optionally, a surface of the electrode plate body is completely coated with an active material.

Optionally, widths of two tabs of a last tab pair in the at least one group of tabs are not equal.

Optionally, widths of a last tab pair, which is adjacent to a next group of tabs, in each group of tabs are not equal.

To solve the above technical problem, the present invention further provides a cell wound by the electrode plate according to the above, comprising: a cell body and two electrodes, wherein the cell body is wound by the electrode plate body, and wherein each of the electrodes is formed by sequentially stacking the at least one group of tabs.

Optionally, each of the electrodes comprises two half electrodes disposed opposite each other, wherein each of the half electrodes is stacked by one of each of the tab pairs, wherein widths of the tabs in each half electrode is sequentially increased from the inner ring to the outer ring of the cell, and wherein each of the half electrodes is centrally symmetrical.

To solve the above technical problem, the present invention further provides a method of manufacturing the electrode plate according to the above, wherein two cutting dies are used for die-cutting the electrode plate body for each group of tabs to obtain the plurality of tab pairs, wherein a length of one cutting die is equal to an interval between two tabs in the plurality of tab pairs, and wherein a length of another cutting die is equal to an interval between each tab pair.

To solve the above technical problem, the present invention further provides a lithium-ion battery, comprising the cell of the above.

Compared with the prior art, the present invention has the following advantages: 1. The present invention adopts the technical solution of fixing the interval between tabs and gradually changing the widths of tabs. Only one time of die-cutting is required for the same tab and its interval, which avoids the secondary die-cutting caused by the increasing interval between the tabs, thereby further avoiding the problem of burrs caused by the two times of die-cutting and reducing the possibility of battery's self-discharge. 2. The body of tabs is completely coated by an active material, which has high energy density and no sharp steps. It reduces the self-discharge rate while improves safety; the continuity of production is achieved by fine-tuning the widths of tabs, which are adjacent to the adjacent group, in each group of tabs; when the thickness of the electrode plate and the separator are changed, the current cutting die can continue to be used, which lower the cost of equipment.

BRIEF DESCRIPTION OF THE DRAWINGS

The features and performance of the present invention are further described by the following embodiments and the accompanying drawings.

PREFERRED EMBODIMENTS OF THE PRESENT INVENTION

Figure 1:
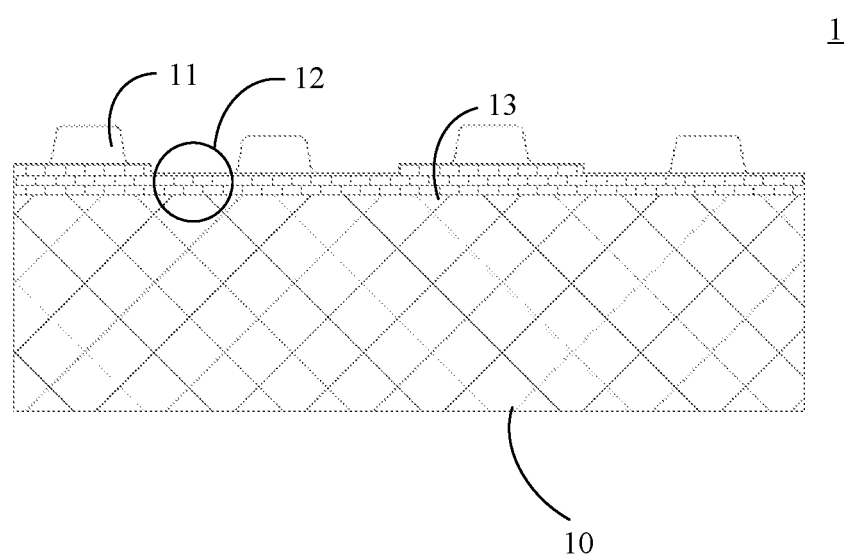
FIG. 1 is a schematic structural diagram of an electrode plate for a wound lithium-ion battery in the prior art.

In order to make the foregoing objects, features, and advantages of the present application more comprehensible, specific embodiments of the present invention are described in detail below with reference to the accompanying drawings.

In the following description, many specific details are set forth in order to fully understand the present invention, but the present invention can also be implemented in other ways than those described herein, so the present invention is not limited by the specific embodiments disclosed below.

As shown in this application and the claims, the words "a", "an", "a kind of" and/or "the" do not specifically refer to the singular, but may include the plural unless the context clearly indicates an exception. In general, the terms "including" and "comprising" are only meant to include clearly identified steps and elements, and these steps and elements do not constitute an exclusive list, and the method or device may also include other steps or elements.

In detailing the embodiments of the present invention, for convenience of explanation, the cross-sectional view showing the structure of the device will not be partially enlarged according to the general scale, and the schematic diagram is only an example, which should not limit the scope of protection of the present invention. In addition, the actual production should include three-dimensional space dimensions of length, width and depth.

For convenience of description, spatially related terms such as "below", "downward", "lower", "under", "above", "up", etc. may be used herein to describe the relationship between an element or feature shown in the drawings with other element or feature. It will be understood that these spatially related terms are intended to encompass the directions of the devices in use or operation other than the directions depicted in the figures. For example, if the device in the figures is turned over, elements described as "below" or "beneath" or "under" other elements or features would then be adapted to "above" the other elements or features. Therefore, the exemplary terms "below" and "under" can encompass both up and down directions. The device may also have other orientations (rotated 90 degrees or in other directions), so the spatially related terms used here should be interpreted accordingly. In addition, it will also be understood that when a layer is referred to as being "between" two layers, it can be the only layer between the two layers, or one or more intervening layers may also be present.

In the context of this application, a structure in which the first feature is described as "on" the second feature may include embodiments in which the first and second features are formed in direct contact, and may also include embodiments in which additional features formed between the first and second features, so that the first and second features may not be in direct contact.

It should be understood that when a component is referred to as being "on another component", "connected to another component", "coupled to another component", or "contact with another component", it may be directly on the other component, connected to or coupled to, or contact with the other component, or an insertion component may be present. In contrast, when a component is referred to as being "directly on another component", "directly connected to", "directly coupled to" or "directly contact with" another component, there are no insertion components. Similarly, when a first component is called "electrically contact with" or "electrically coupled to" a second component, there is an electrical path between the first component and the second component that allows current to flow. The electrical path may include capacitors, coupled inductors, and/or other components that allow current to flow, even without direct contact between conductive components.

Figure 2:
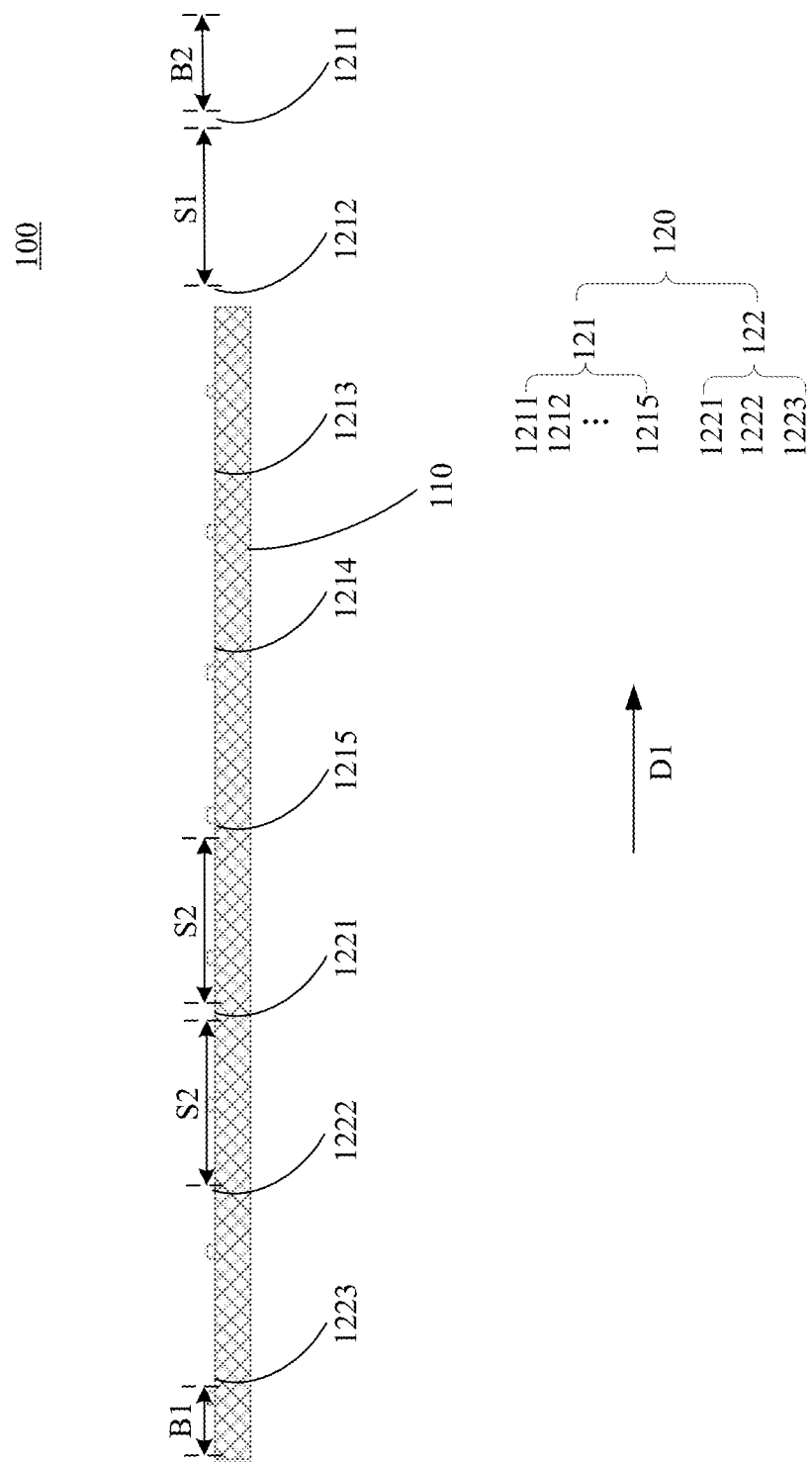
FIG. 2 is a schematic structural diagram of an electrode plate for a wound lithium-ion battery according to an embodiment of the present invention.

FIG. 2 is a schematic structural diagram of an electrode plate for a wound lithium-ion battery according to an embodiment of the present invention. Referring to FIG. 2, the present invention provides an electrode plate for a wound lithium-ion battery. The electrode plate includes an electrode plate body 110 and a plurality of tabs 120. The plurality of tabs 120 are divided into at least two groups. Widths of each tab 120 in each group are sequentially increased by $2\pi\Delta t$. Widths of tabs 120 of the adjacent two groups are different. Interval between adjacent tabs 120 in each group is equal.

Interval between adjacent tabs 120 in a latter group is equal to or different from interval between adjacent tabs 120 in a former group.

A numerical number of tabs 120 in each group of tabs is 3-36.

Interval between adjacent tabs 120 in each group of tabs is 120 mm~400 mm.

In this embodiment, the electrode plate body 110 is in a long strip shape, including the electrode plate body 110 and a plurality of tabs 120. On one long side of the electrode plate body 110, there is a rectangular tab 120 protruding upward at intervals. The plurality of tabs 120 can be divided into at least two groups. Each group of tabs 120 includes a plurality of tabs 120. Interval between the plurality of tabs 120 in each group is equal, and widths of the plurality of tabs 120 are sequentially increased by $2\pi\Delta t$, where $\Delta t$ is a sum of the thicknesses of two layers of a separator, a positive electrode plate and a negative electrode plate. The reason for this setting is that, when the electrode plate 100 of this embodiment is wound to make a cell of a lithium-ion battery, it can be formed by winding two layers of the electrode plate 100 and two layers of the separator after alternately stacking them. The formed cell includes a positive electrode plate and a negative electrode plate. Therefore, for each turn of winding, the perimeter of the cell will be increased by $2\pi\Delta t$. Increasing the width of the tab 120 by $2\pi\Delta t$ can align the tab 120 of each turn along its central axis, and the widths of the tabs are sequentially increased from the inner ring to the outer ring of the cell. The separator is a selectively permeable membrane that allows lithium ions to pass, but does not allow electrons to pass. It is placed between the positive electrode plate and the negative electrode plate to prevent short circuits caused by direct contact between the positive electrode plate and negative electrode plate. At the same time, under the circumstance of an external short circuit or high temperature, the separator will shrink and close the lithium ion channel, preventing further reactions and ensuring the safety of the lithium-ion battery.

In some embodiments, interval between adjacent tabs in any first group of tabs from the at least two groups of tabs 120 is equal to interval between adjacent tabs in a second group of tabs from the at least two groups of tabs 120.

In some other embodiments, interval between adjacent tabs in any first group of tabs from the at least two groups of tabs 120 is not equal to interval between adjacent tabs in a second group of tabs from the at least two groups of tabs 120.

In some embodiments, a surface of the electrode plate 100 is completely coated with an active material. No additional active material is needed to coat on the connection part of the tab 120 and the electrode plate body 110.

In some embodiments, a numerical number of tabs 120 in each group of tabs may be 3-36.

In some embodiments, interval between adjacent tabs 120 in each group is 10 mm~400 mm.

In some embodiments, in each group of tabs 120, except that the widths of the plurality of tabs 120 are sequentially increased by $2\pi\Delta t$, the width of the last tab in each group of tabs 120 is specially set. That is, the width of the last tab in each group of tabs 120 is equal to the width of a third tab from the last in that group. For example, assume there are two groups of tabs on the electrode plate body 110. The first group of tabs includes 5 tabs, and the second group of tabs includes 3 tabs. Then the widths of the first 4 tabs in the first group of tabs are sequentially increased by $2\pi\Delta t$, and the width of the fifth tab in the first group of tabs is the same as the width of the third tab in the first group of tabs. That is to say, the width of the fifth tab in the first group of tabs is not increased compared to the width of the fourth tab, but decreases. In the same way, the widths of the first 2 tabs in the second group of tabs are sequentially increased by $2\pi\Delta t$, and the width of the third tab in the second group of tabs is equal to the width of the first tab in the second group of tabs. That is to say, the width of the third tab in the second group of tabs is not increased compared to the width of the second tab, but decreases. It can be understood that these embodiments emphasize the setting of the width of the last tab in each group, and these groups of tabs 120 may have another adjacent group of tabs 120 before or after them.

In some embodiments, except that the widths of the plurality of tabs 120 in each group of tabs are sequentially increased by $2\pi\Delta t$, the width of the last tab adjacent to the next group of tabs 120 in each group of tabs 120 is specially set. That is, the width of the last tab adjacent to the next group of tabs 120 in each group of tabs 120 is equal to the width of the third tab from the last tab in the group. It can be understood that, in these embodiments, the case of a tab group having a next adjacent group is emphasized.

The purpose of specially setting the width of the last tab in each group and/or the width of the last tab adjacent to the next group of tabs in each group is to ensure the production continuity of the electrode plate 100. The detail of this method, which makes the widths of the plurality of tabs 120 in each group of tabs 120 be sequentially increased by $2\pi\Delta t$, and makes the width of the last tab in that group of tabs 120 be equal to the width of the third tab from the last in that group, will be explained later.

In a preferred embodiment, the plurality of tabs 120 are divided into two groups, that is, N=2.

As shown in FIG. 2, there are 5 tabs in the first group of tabs and 3 tabs in the second group of tabs. The widths of the tabs of the first group of tabs are sequentially increased from 14.00 mm to 19.20 mm, and the widths of the tabs of the second group of tabs sequentially are increased from 17.47 mm to 15.73 mm. The interval between tabs in the first group of tabs is 160.09 mm, which is equal to the length of the first cutting die. The interval between tabs in the second group of tabs is 167.03 mm, which is equal to the length of the second cutting die. All the interval is formed by cutting only once with the cutting dies.

As shown in FIG. 2, the width of tab 1215 should be greater than 19.20 mm because it is the last tab of the first group 121. Here, it is fine-tuned to 17.47 mm to ensure the second cutting die can be accurately connected, and the accumulated error will be reset to zero. Tab 1221 is the first tab in the second group 122. The width of tab 1221 is equal to the second tab 1212 in the first group, and its change rule is the same as the first group. Tab 1223 is the last tab in the second group. The width of tab 1223 should be 19.20 mm but now it is fine-tuned to 15.73 mm to ensure that B1+B2=167.03 mm.

Among them, during the continuous production of the electrode plates, B1 is the margin of the last tab in the previous electrode plate, and B2 is the margin of the first tab in the next electrode plate. B1 and B2 are cut by the same cutting die. In this embodiment, B1 and B2 are both cut by the second cutting die, so the sum of B1 and B2 is equal to the length of the second cutting die.

In the preferred embodiment shown in FIG. 2, there are 8 tabs on the electrode plate body 110. The 8 tabs 120 are divided into two groups. The first group 121 includes 5 tabs (1211~1215), while the second group 122 includes 3 tabs (1221~1223). In this embodiment, $\Delta t$=0.276 mm. Assume the width of the j-th tab of the i-th group is $W_{ij}$, then the width of the first tab 1211 in the first group 121 is $W_{11}$, and the widths of the remaining tabs in the first group 121 are sequentially increased by $2\pi\Delta t$; the width of the first tab 1221 in the second group 122 is $W_{21}$, and the widths of the remaining tabs in the second group 122 are sequentially increased by $2\pi\Delta t$.

While die-cutting the electrode plate 100, the position of the cutting die is fixed, and the electrode plate 100 is moved to be cut by the cutting die. In this preferred embodiment, the moving direction of the electrode plate 100 is shown as a first direction D1 in FIG. 2. In the process of die-cutting the electrode plate 100, two cutting dies with different lengths correspond to two groups of tabs respectively. The length of the first cutting die is equal to the interval S1 between the tabs in the first group 121, and the length of the second cutting die is equal to the interval S2 between the tabs in the second group 122.

Figure 3:
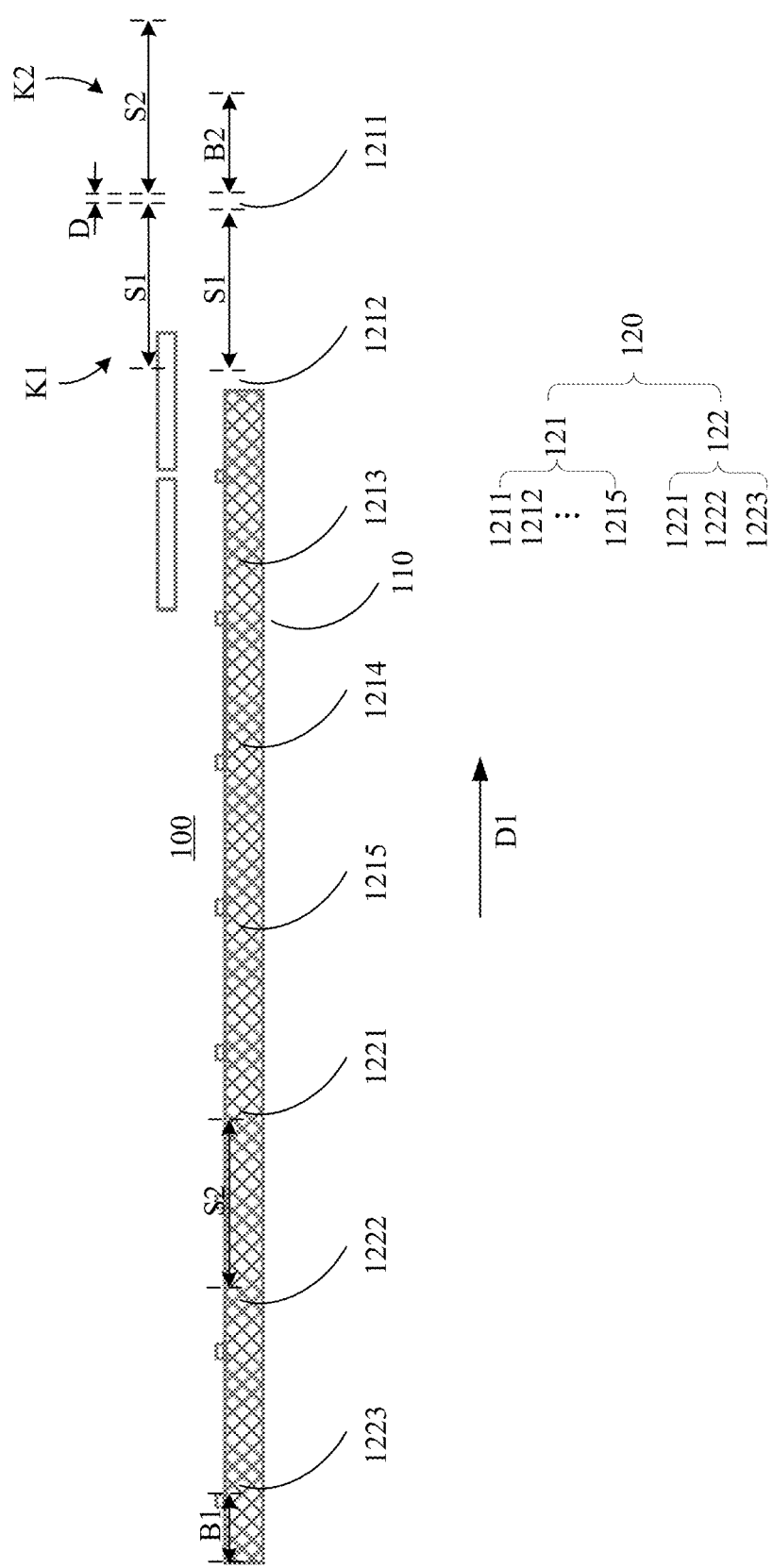
FIG. 3 is a first schematic diagram of the relative positions of the electrode plate and the cutting die when manufacturing the electrode plate shown in FIG. 2.

FIG. 3 is a schematic diagram of the relative positions of the electrode plate 100 and the cutting die when manufacturing the electrode plate 100 shown in FIG. 2. Referring to FIG. 3, two cutting dies, which are needed to manufacture the electrode plate 100 in the preferred embodiment shown in FIG. 2, respectively are a first cutting die K1 and a second cutting die K2. Among them, the length of the first cutting die K1 is equal to the interval S1 between the tabs in the first group 121, and the length of the second cutting die K2 is equal to the interval S2 between the tabs in the second group 122. In the process of die-cutting the electrode plate 100, the positions of the first cutting die K1 and the second cutting die K2 are fixed, and the interval between the two cutting die is D. During the die-cutting process, the electrode plate 100 is moved to an appropriate position in the direction showed by the first direction D1, and then the electrode plate 100 is die-cut by the first cutting die K1 or the second cutting die K2 to obtain the required tab width and interval between tabs.

Figure 4:
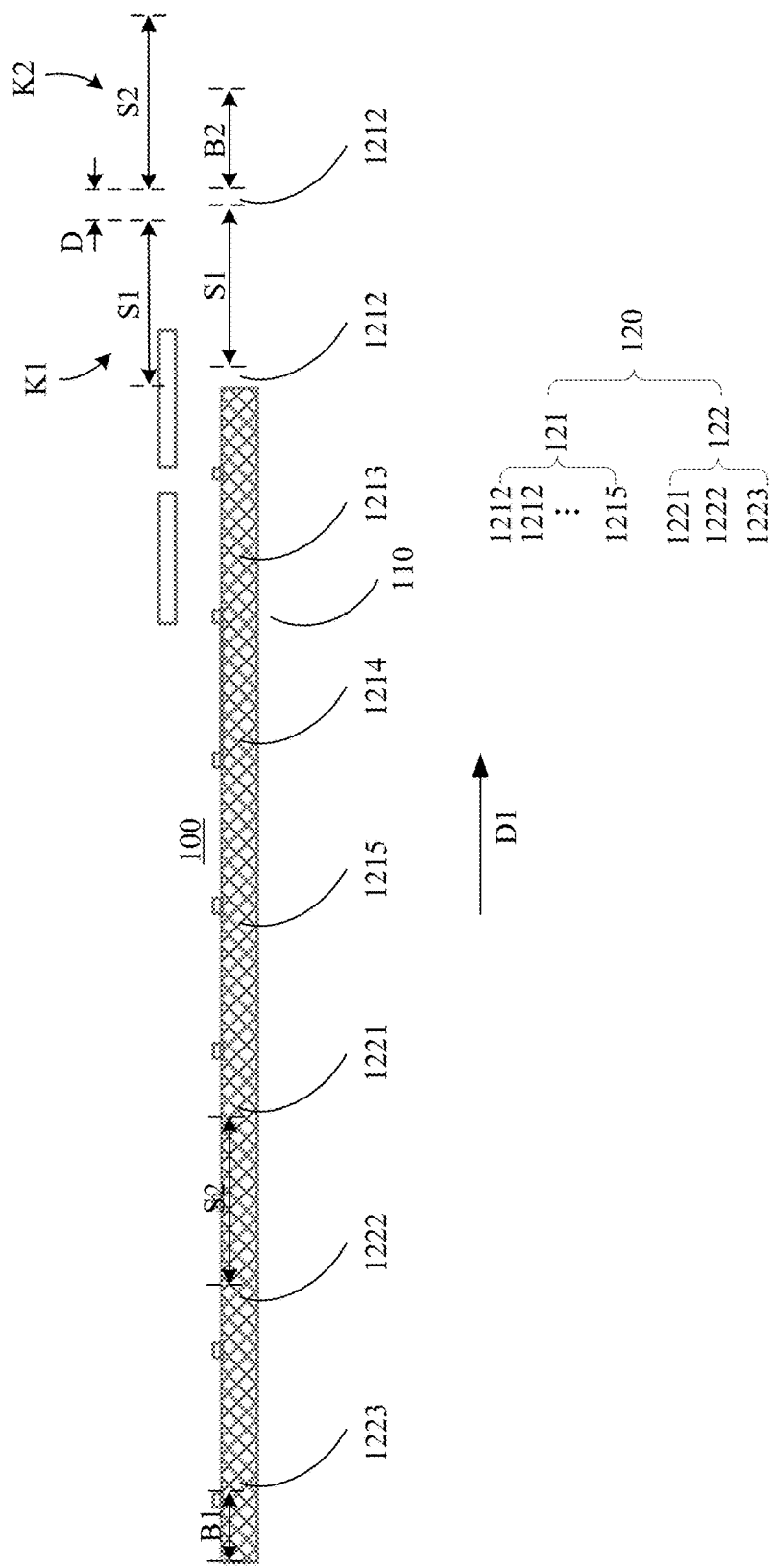
FIG. 4 is a second schematic diagram of the relative positions of the electrode plate and the cutting die when manufacturing the electrode plate shown in FIG. 2.

The manner for die-cutting the electrode plate 100 is related to the interval D between the two cutting dies. FIG. 3 is a schematic diagram that the interval D is smaller than the width of the first tab 1211 in the first group 121. FIG. 4 is a schematic diagram that the interval D is greater than the width of the first tab 1211 in the first group 121. The method of manufacturing the electrode plate 100 shown in FIG. 2 will be described below with reference to FIGS. 3 and 4 respectively.

Referring to FIG. 3, the interval D between the two cutting dies is smaller than the width of the first tab 1211 in the first group 121. It can be understood that the electrode plate 100 shown in FIG. 3 is an electrode plate 100 which has two groups of tabs formed after die-cutting. In practice, before the die-cutting, these tabs have not been formed on the electrode plate 100 yet. Among them, assume the width of the j-th tab of the i-th group is $W_{ij}$, and the amount of the group of tabs is N. In this embodiment, i≤2, j≤5, the first group includes 5 tabs, the second group includes 3 tabs, and N=2. The manufacturing method of this specific electrode plate 100 includes the following steps:

S301: Use a first cutting die K1 to cut an interval of B2 at one end of the electrode plate 100;

B2 is the outer margin of the first tab on the electrode plate 100. Since the electrode plate 100 moves along the first direction D1, the first tab 1211 in the first group 121 on the electrode plate 100 is the first tab on the electrode plate 100.

It should be noted that FIG. 3 shows the interval of B2 which is cut at the rightmost end of the electrode plate 100. In other embodiments, this interval may be cut at the leftmost end of the electrode plate 100 while the electrode plate moves in the direction opposite to the first direction D1.

S302: Align the right side of the first tab 1211 in the first group 121 with the left side of the second cutting die K2;

S303: Let i=1, and j=1;

S304: Move the electrode plate 100 forward by $W_{ij}$-D along the first direction D1, and then stop;

S305: Die-cut the electrode plate 100 by the first cutting die K1 to obtain the j-th tab of the i-th group, and the width of the tab is $W_{ij}$;

S306: Let j=j+1;

S307: Move the electrode plate 100 forward by $W_{ij}$+S1 along the first direction D1, and then stop;

S308: Repeat the steps S305-S307 until the right side of the last tab of the i-th group is cut out, and the first four tabs of the first group 121 have been formed, and j=5;

S309: Move the electrode plate 100 forward by S1+S2+D+$W_{15}$ along the first direction D1, and then stop;

S310: Die-cut the electrode plate 100 by the second cutting die K2 to obtain the fifth tab of the first group, and the width of the tab is $W_{15}$;

S311: Let i=i+1, and j=1;

S312: Move the electrode plate 100 forward by $W_{ij}$+S2 along the first direction D1, and then stop;

S313: Die-cut the electrode plate 100 by the second cutting die K2 to obtain the j-th tab of the i-th group, and the width of the tab is $W_{ij}$;

S314: Let j=j+1;

S315: Repeat the steps S313-S315 until the left side of the last tab 1223 of the i-th group is cut out. The interval between the left side of the last tab 1223 and the leftmost end of the electrode plate 100 is B1;

B1 is the margin of the last tab in the electrode plate 100, and in this embodiment, the last tab is the last tab 1223 in the second group 122.

S316: Split the electrode plate 100;

S317: Go back to the step S301 and start to cut the next electrode plate 100.

Referring to FIG. 4, the interval D between the two cutting dies is greater than the width of the first tab 1211 in the first group 121, and smaller than the sum of the width S2 of the second cutting die K2 and the width of the first tab 1211 in the first group 121, that is, $W_{11} \leq D < W_{11}+S2$. The manufacturing method of this specific electrode plate 100 includes the following steps:

S401: Use a first cutting die K1 to cut an interval of B2 at one end of the electrode plate 100;

S402: Let i=1, and j=1;

S403: Move the rightmost end of the electrode plate 100 to a position which is B2+$W_{ij}$ away from the right end of the first cutting die K1, and then stop;

S404: Die-cut the electrode plate 100 by the first cutting die K1 to obtain the j-th tab of the i-th group, and the width of the tab is $W_{ij}$;

S405: Let j=j+1;

S406: Move the electrode plate 100 forward by $W_{ij}$+S1 along the first direction D1, and then stop;

S407: Repeat the steps S404-S406 until the right side of the last tab of the i-th group is cut out. At this time the first four tabs of the first group 121 have been formed, and j=5;

S408: Move the electrode plate 100 forward by S1+S2+D+$W_{ij}$ along the first direction D1, and then stop;

S409: Die-cut the electrode plate 100 by the second cutting die K2 to obtain the fifth tab of the first group, and the width of the tab is $W_{15}$;

S410: Let i=i+1, and j=1;

S411: Move the electrode plate 100 forward by $W_{ij}$+S2 along the first direction D1, and then stop;

S412: Die-cut the electrode plate 100 by the second cutting die K2 to obtain the j-th tab of the i-th group, and the width of the tab is $W_{ij}$;

S413: Let j=j+1;

S414: Repeat the steps S412-S413 until the right side of the last tab of the i-th group is cut out. In this embodiment, after this step, the first two tabs of the second group 122 have been formed, and j=3;

S415: Move the electrode plate 100 forward by $W_{11}$+$W_{ij}$+S2−D along the first direction D1, and then stop;

S416: Die-cut the electrode plate 100 by the first cutting die K1;

S417: Move the electrode plate 100 forward by D−$W_{11}$ along the first direction D1, and then stop;

S418: Die-cut the electrode plate 100 by the second cutting die K2;

S419: Split the electrode plate 100, and move the electrode plate 100 forward by S1+$W_{11}$+$W_{12}$−D along the first direction D1;

S420: Go back to the step S402 to cut the next electrode plate 100.

When the interval D between the two cutting dies is greater, corresponding adjustment is performed according to the steps S415-418 as above, so that the electrode plate 100 does not need to be rewound during the manufacturing process.

FIG. 3 and FIG. 4 are exemplary diagrams of the present invention. For the preferred embodiment shown in FIG. 2, when the positions of two cutting dies have changed, such as that the positions of the first cutting die K1 and the second cutting die K2 are interchanged or the interval D between the two cutting dies is changed, the method of die-cutting the electrode plate 100 is similar.

In some embodiments, when there are more than two groups of tabs on the electrode plate, each group of tabs corresponds to one cutting die. The method of die-cutting the electrode plates in these embodiments can be adjusted correspondingly with reference to the method described above.

In the preferred embodiment shown in FIG. 2, in order to ensure the continuity of production, the width of the last tab in each group of tabs 120 may be fine-tuned. Specifically, in the electrode plate 100 shown in FIG. 2, the interval S1 between two adjacent tabs in the first group 121 is S1=160.09 mm, and the width of the first tab 1211 in the first group 121 is $W_{11}$=14.00 mm. The widths of the remaining tabs in the first group 121 are sequentially increased by $2\pi\Delta t$, and $\Delta t$=0.276 mm. That is, $W_{12}$=15.73 mm, $W_{13}$=17.47 mm, $W_{14}$=19.20 mm, and $W_{15}$=20.93 mm. In order to ensure the continuity of production, when die-cutting to the last tab 1215 in the first group 121, the width of the last tab 1215 is equal to the width of the third tab from the last in the first group 121, which means that $W_{15}$=$W_{13}$=17.47 mm. In this way, the interval between the last tab 1215 of the first group 121 and the first tab 1221 of the second group 122 can be equal to the length S2 of the second cutting die K2, thereby realizing the transition from the first cutting die K1 to the second cutting die K2.

Similarly, the interval S2 between two adjacent tabs in the second group 122 is S2=167.03 mm, and the width of the first tab 1221 in the second group 122 is $W_{21}$=15.73 mm. The widths of the remaining tabs in the second group 122 are sequentially increased by $2\pi\Delta t$, that is, $W_{22}$=17.47 mm, and $W_{23}$=19.20 mm. In order to ensure the continuity of production, when die-cutting to the last tab 1223 in the second group 122, the width of the last tab 1223 is equal to the width of the third tab from the last in the second group 122, which means that $W_{23}$=$W_{21}$=15.73 mm. In this way, the sum of the outer margin B1 of the last tab 1223 on the electrode plate 100 and the outer margin B2 of the first tab 1211 on the next electrode plate 100 to be die-cut in continuous production is equal to the length S2 of the second cutting die K2, that is, B1+B2=S2. Thereafter, the first cutting die K1 is used to die-cut the adjacent tabs in the first group of tabs on the next electrode plate 100, and so on.

It can be understood that the first cutting die K1 can also be used for die-cutting the outer margin B1 and the outer margin B2. In this embodiment, the second cutting die K2 needs to be replaced with the first cutting die K1. And then fine-tune the manner of the movement of the electrode plate, so that B1+B2=S1.

On one hand, the electrode plate after fine-tuning the width of the tab can ensure the accuracy of the connection between different cutting dies during the manufacturing process; on the other hand, when the electrode plate is wound to form a cell of a lithium-ion battery, the plurality of tabs which forms each electrode can be center aligned, and certain safe interval is maintained between two electrodes.

Figure 5:
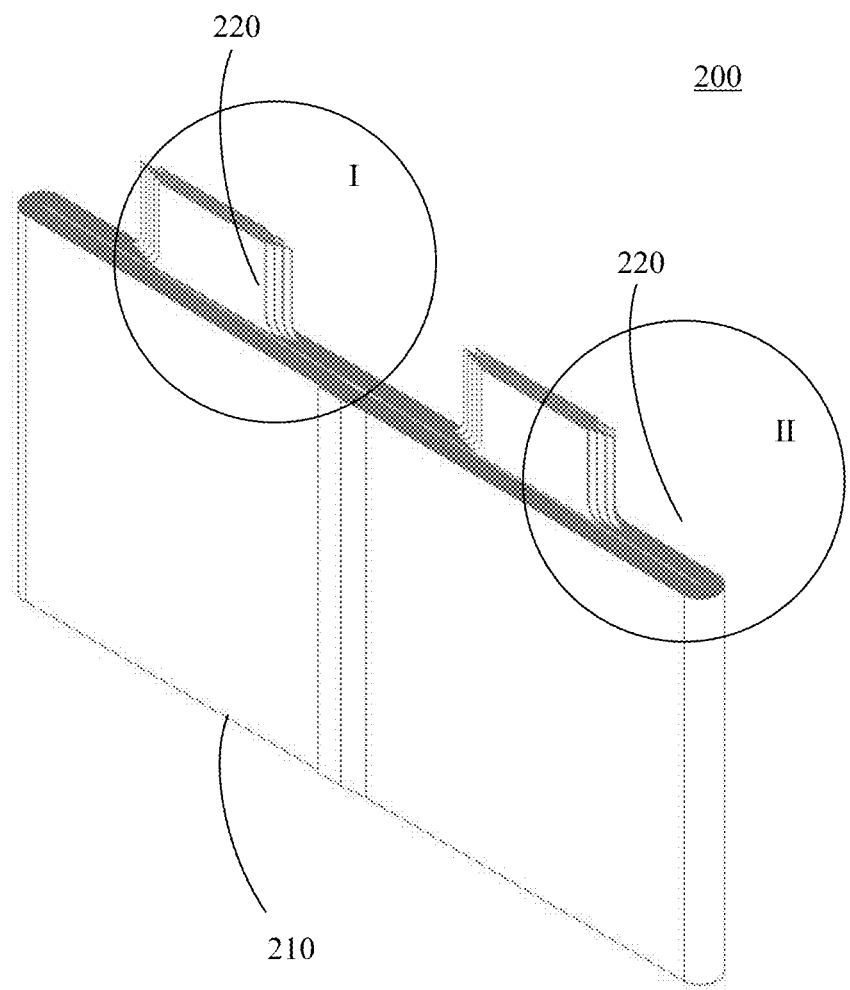
FIG. 5 is a schematic structural diagram of a cell of a lithium-ion battery formed by winding the electrode plate shown in FIG. 2.

FIG. 5 is a schematic structural diagram of a cell of a lithium-ion battery 200 formed by winding the electrode plate 100 shown in FIG. 2. Referring to FIG. 5, the cell of the lithium-ion battery formed by winding the electrode plate shown in FIG. 2 includes a cell body 210 and two electrodes 220. The cell body 210 is wound from the electrode plate body 110. The electrode 220 is formed by stacking a plurality of layers of tabs 120. The widths of the plurality of layers of tabs 120 sequentially decrease from the middle to the two sides.

It can be understood that the cell body 210 in FIG. 5 includes a positive electrode plate and a negative electrode plate, and the electrode plates are as shown in FIG. 2. Two electrodes 220 are formed respectively by winding the positive electrode plate and the negative electrode plate.

Figure 6A:
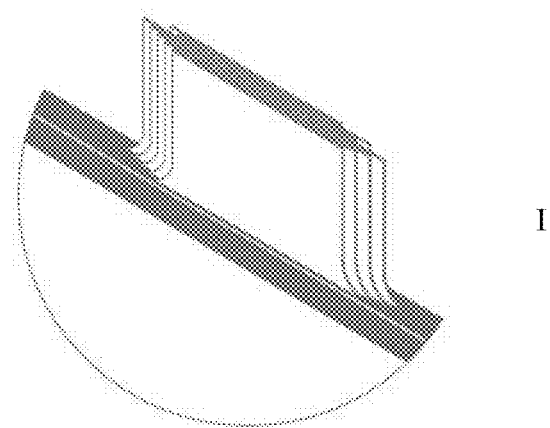
FIG. 6A is a partially enlarged view of the area I in FIG. 5.
Figure 6B:
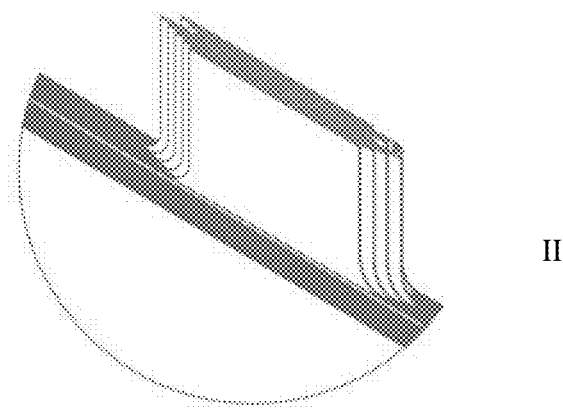
FIG. 6B is a partially enlarged view of the area II in FIG. 5.

FIGS. 6A and 6B respectively are partially enlarged views of regions I and II in FIG. 5, respectively showing the structures of two electrodes 220 of the cell 200. Among them, one is anode and one is cathode. Referring to FIGS. 6A and 6B, each electrode 220 is formed by sequentially stacking at least two groups of tabs 120 of each electrode plate. The width of each tab in each group of tabs 120 in each electrode 220 is sequentially increased from the inner ring of the cell body 210 to the outer ring of the cell body 210. Therefore, when the cell 200 is wound by the electrode plate 100 in the preferred embodiment shown in FIG. 2, the tabs in the first group 121 are stacked in order first, and the widths of the tabs is sequentially increased from the inner ring of the cell body 210 to the outer ring of the cell body 210. When continue winding the second group of tabs after the first group of tabs is wound, because the width of the first tab 1211 in the second group 121 is smaller than the width of the last tab 1225 in the first group 122, the width of the tabs of the cell 200 will be decreased first, and then sequentially increased toward the outer ring of the cell body 210. The purpose of this design is to ensure that the interval between the two electrodes 220 of the cell 200 is within a range of safe interval.

It can be understood that when the electrode plate 100 has more than two groups of tabs 120, corresponding to each group of tabs 120, the widths of the tabs, which are in the two electrodes 220 of the cell 200 wound by the electrode plate 100, are sequentially increased from the inner ring to the outer ring of the cell body 210. After one group of tabs 120 is wound, the widths of tabs in the next group of the tabs 120 will be reduced first, and then sequentially increased from the inner ring to the outer ring of the cell body 210, until all the electrode plates 100 have been wound.

In some embodiments, a positive electrode plate can be obtained by coating a positive active material on the surface of one electrode plate 100, and a negative electrode plate can be obtained by coating a negative active material on the surface of another electrode plate 100. The positive electrode of the cell 200 is formed by stacking at least two groups of tabs 120 of the positive electrode plate, and the negative electrode of the cell 200 is formed by stacking at least two groups of tabs 120 of the negative electrode plate. The electrode plate 100 is obtained according to the preferred embodiment shown in FIG. 2, the positive electrode of the cell 200 is formed by stacking two groups of tabs 120 on the positive electrode plate, and the negative electrode of the cell 200 is formed by stacking two groups of tabs 120 on the negative electrode plate.

Compared with the prior art, the filled areas in the present invention are all active materials, while the conventional process requires a reserved area for coating ceramic insulating materials. Therefore, the present invention can increase energy density and reduce costs. The interval between the tabs in the present invention is formed by die-cutting once while the conventional process requires die-cutting twice, which will generate a sharp step. The present invention avoids this step, and can reduce the self-discharge rate of the battery and improve the yield.

Therefore, by adopting the present invention, there is only one die-cutting between adjacent tabs, the die loss is reduced, and the self-discharge rate of the battery is reduced. The electrode plate is completely coated with the active material, which reduces the process complexity and improves the energy density of the battery, while not using ceramic materials lowers the cost of production. N groups of tabs can reduce the error of processing between groups to 1/N, which improves manufacturing accuracy, reduces equipment requirements, and improves yield. The continuity of the production line is achieved by fine-tuning the widths of the tabs. At the same time, after the thickness of the electrode plate and the thickness of the separator are changed, the existing cutting die can continue to be used, which reduces the investment cost of equipment.

Figure 7:
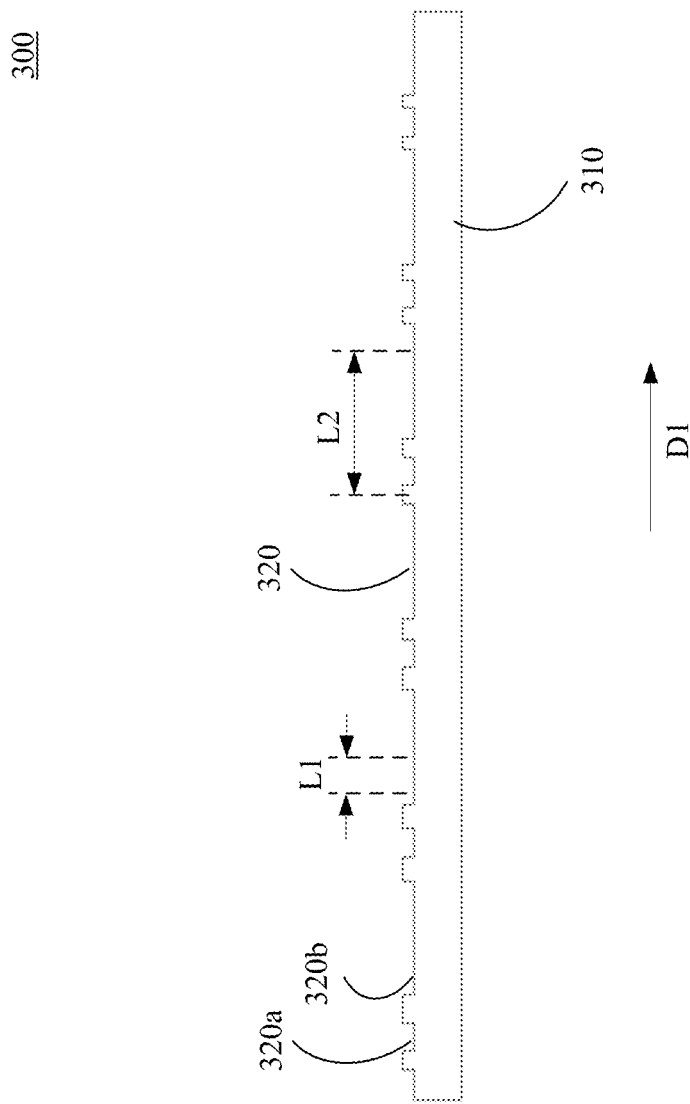
FIG. 7 is a schematic structural diagram of an electrode plate for a wound lithium-ion battery according to another embodiment of the present invention.

FIG. 7 is a schematic structural diagram of an electrode plate 300 for a wound lithium-ion battery according to another embodiment of the present invention. Referring to FIG. 7, the electrode plate 300 of the present embodiment includes an electrode plate body 310 and at least one group of tabs 320 set on the electrode plate body 310. Each group 320 has a plurality of tab pairs. The widths of the two tabs of each pair in the plurality of tab pairs are equal. The interval L1 between two tabs of each pair is equal. The interval L2 between each tab pairs are equal. The widths of the tabs are sequentially increased by $\pi \Delta t$, where $\Delta t$ is the sum of the thicknesses of a positive electrode plate, a negative electrode plate and two layers of the separator of the cell of the lithium-ion battery. The number of tabs in each group is 5~80.

In some embodiments, in addition to the case where the widths of a plurality of tab pairs in the at least one group of tabs 320 are equal, a special case is also included, that is, the widths of the two tabs of the last pair in the at least one group of tabs 320 may be unequal.

In some embodiments, in addition to the case where the widths of a plurality of tab pairs in the at least one group of tabs 320 are equal, a special case is also included, that is, the width of the tabs in the last tab pair in each group of tabs 320 adjacent to the next group of tabs may be unequal.

It can be understood that the purpose of these embodiments to specifically set the width of the tabs in the last tab pair in a group of tabs is to ensure that different cutting dies can be smoothly connected when die-cutting the next group of tabs during the process of continuous production of the electrode plate.

In some embodiments, the surface of the electrode plate body 310 is completely coated with active materials.

Referring to FIG. 7, in a preferred embodiment, there are 12 tabs 320 on the electrode plate body 310, and the 12 tabs 320 are divided into one group and there are 6 pairs of tabs in this group. The widths of the 2 tabs in each pair are equal. The widths of the tabs of two adjacent pairs of tabs are sequentially increased by 0.867 mm. The interval between the two adjacent pairs of tabs is 34.956 mm, and the interval between the two tabs of each pair is 8.522 mm. In order to ensure the continuity of the production line, the width of the last tab is slightly narrower than another tab in that pair.

When manufacturing the electrode plate 300 shown in FIG. 7, a die-cutting method using metal cutting die may be adopted. The position of the cutting die is fixed. The electrode plate 300 moves in the first direction D1. When the distance that the electrode plate 100 has moved reaches a proper distance, the electrode plate 100 stops moving and the electrode plate 300 is cut by the cutting die.

Although the electrode plate 300 shown in FIG. 7 includes only one group of the tabs 320, the method can be applied to the electrode plate 300 having a plurality groups of tabs 320. In this method, two cutting dies are used to die-cut the electrode plate body 310 for each group of tabs 320 to obtain a plurality pairs of tabs. Among them, the length of the first cutting die is equal to the interval L1 between the two tabs 320 of the plurality pairs of tabs, and the length of the second cutting die is equal to the interval L2 between each tab pair.

The method for manufacturing the electrode plate 300 in the preferred embodiment shown in FIG. 7 is specifically described below. The method includes the following steps:

S701: Adjust the interval D between the two cutting dies to D=3 mm, which is smaller than W=4 mm;

S702: Align one end of the electrode plate with the front end of the first cutting die;

S703: Set a process count, cnt=0;

S704: Move the electrode plate forward by L1+L2+D=8.522+34.956+3=46.478 mm;

S705: Die-cut the electrode plate by the second cutting die;

S706: Move the electrode plate forward by W+cnt×Δt−D=4+cnt×0.276−3;

S707: Die-cut the electrode plate by the first cutting die;

S708: Move the electrode plate forward by W+cnt×Δt;

S709: Set the process count, cnt=cnt+1;

S710: Repeat the process from S704 to S709 until the end.

Among them, the W is the width of the first tab, the process count is the operating parameter of the cycle counter, the L1 is the length of the first cutting die, the L2 is the length of the second cutting die, and L1≠L2.

In the above method, the length of the first cutting die is the interval L1 between the two tabs of each tab pair in the group. In the preferred embodiments shown in FIG. 7, L1=8.522 mm. In some embodiments, the interval L1 between the two tabs of each tab pair is 5 mm≤L1≤280 mm.

In the above method, the length of the second cutting die is the interval L2 between each tab pairs in the group. In the preferred embodiments shown in FIG. 7, L2=34.956 mm. In some embodiments, the interval L2 between each tab pairs is 5 mm≤L2≤280 mm.

In the preferred embodiments shown in FIG. 7, Δt=0.276 mm, which is the same as the preferred embodiments shown in FIG. 2.

It can be understood that when manufacturing an electrode plate 300 having two or more groups of tabs, the die-cutting method for each group of tabs is similar to the above method, except that the lengths of the first cutting die and the second cutting die are different. For different groups of tabs, the interval L1 between the two tabs of each tab pair in each group is equal to the length of the first cutting die, and the interval L2 between each tab pairs in each group is equal to the second cutting die. The first cutting die and second cutting die, which correspond to each group of tabs, are sequentially used to die-cut the corresponding group of tabs, and then an electrode plate with two or more group of tabs can be obtained.

Figure 8:
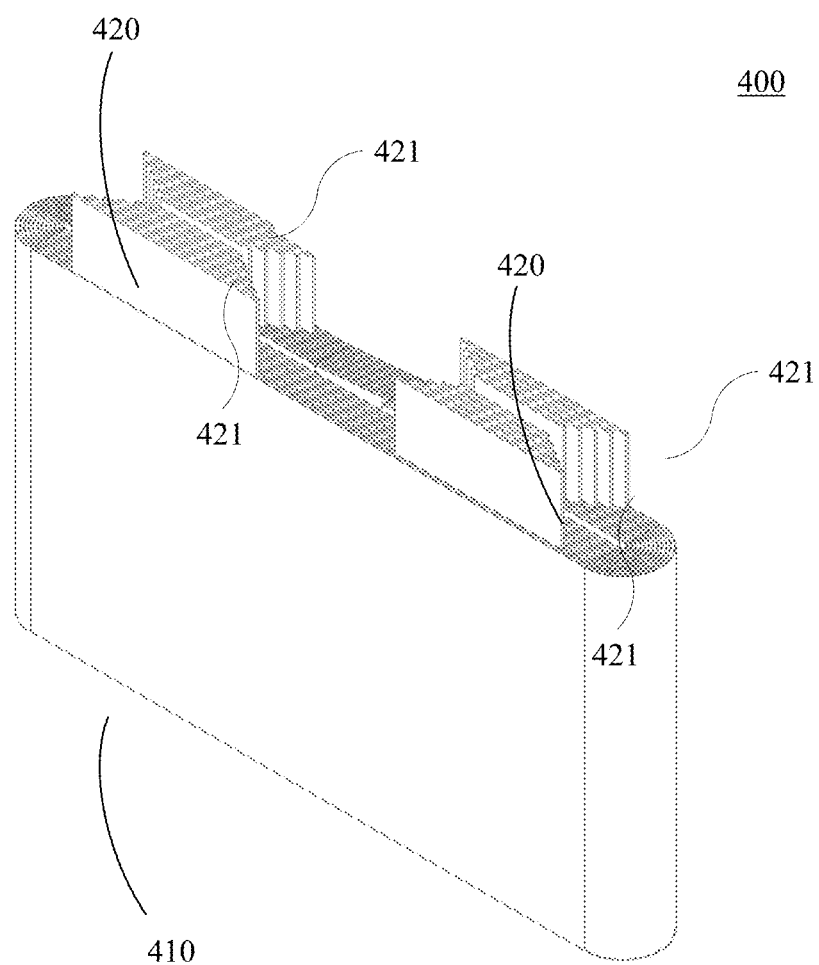
FIG. 8 is a schematic structural diagram of a cell of a lithium-ion battery formed by winding the electrode plate shown in FIG. 7.

FIG. 8 is a schematic structural diagram of a cell of a lithium-ion battery 400 formed by winding the electrode plate 300 shown in FIG. 7. As shown in FIG. 8, the cell 400 includes a cell body 410 and two electrodes 420, and each of the electrodes 420 comprises two half electrodes 421 disposed opposite of each other. There is an interval between the two half electrodes 421 which are mirror-symmetrical. Each of the electrodes 420 is formed by the at least one group of tabs stacked in sequence. Each of the half electrodes 421 is stacked by one of each of the tab pairs.

The cell body 410 is wound by the electrode plate body 310, and the half electrode 421 is wound by the tab 320. The widths of the tabs in the half electrode 421 are sequentially increased from the inner ring to the outer ring of the cell, and the half electrode 421 is centrally symmetrical.

The specific winding method is:

1. Manufacture two kinds of electrode plate separately, and coat positive active material and negative active material on the surface of the two kinds of electrode plate separately. Die-cut the electrode plate with metal cutting-die to obtain a plurality of tabs. The widths of tabs and interval between tabs can be designed flexibly according to the cell power and operating condition to get a positive electrode plate and a negative electrode plate. Control the widths of the tabs of the positive electrode plate to increase with the increasing number of turns, and the widths of the tabs in the same turn are the same. The difference between the widths of tabs in different turns is an arithmetic sequence with a tolerance of 0.867 mm. Tolerance=πΔt, where Δt is the sum of the thicknesses of a positive electrode plate, a negative electrode plate and two layers of a separator. The changing rule of the widths of the tabs of the negative electrode plate is the same as that of the positive electrode plate. The widths of the tabs in the same turn are the same, and the tolerance is the same as that of the positive electrode plate. The width of the initial tab on the positive and negative electrode can be designed according to the discharge capacity of the cell.

2. Intersect the positive electrode plate, the negative electrode plate and the two layers of the separator and stack them. Control all the tabs of all the electrode plates toward the same side, and wind them after two turns to form the cell. It should be noted during the winding process: after determining the width of tabs, in order to ensure the integrity of the winding, it is necessary that there is a pair of tab in each turn. The interval between the two tabs of the first turn is the same as the interval between the two tabs of the second turn, and the length is 34.956 mm and so on; the distance from the second tab of the first turn to the first tab of the second turn is the same as the distance from the second tab of the second turn to the first tab of the third turn, and the length is 8.522 mm and so on. Each interval can be formed by die-cutting once, and two cutting dies are required if cutting with metal cutting die. In order to ensure the continuity of the process, the electrode plate of the previous cell need to be continuous with the electrode plate of the latter cell.

After the positive and negative electrode plates with different tabs and intervals are obtained, the positive and negative electrode plates are wound into a cell by a circular winding pin with two layers of the separator in the middle, and the tabs are on the same side after winding. The main structure of the core is shown in FIG. 8. The first layer of the separator, the negative electrode plate, the second layer of the separator, and the positive electrode plate are wound around the winding pin to form a cell. The positive electrode and the negative electrode each have two groups of tabs. Each group includes a plurality of tabs. After winding, the tabs are evenly distributed on the winding pins, and the final cell is obtained after hot pressing. Because there are two tabs with the same width in each turn of the battery, the battery is mirror-symmetric after winding, which is different from the current square battery with AB cell. This can reduce the mechanism setting of the winding equipment and increase the simplicity of the process.

Figure 9:
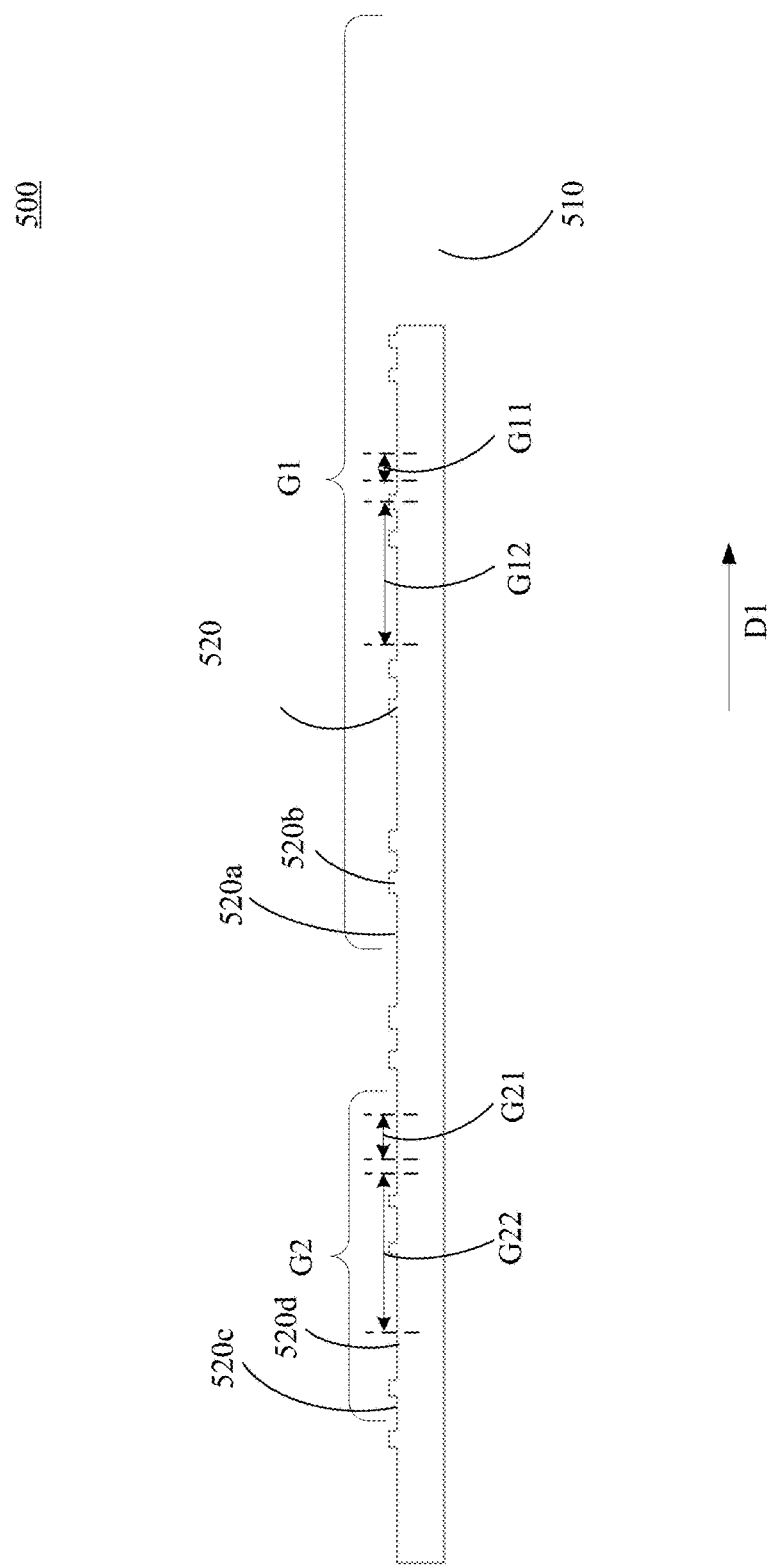
FIG. 9 is a schematic structural diagram of an electrode plate for a wound lithium-ion battery according to another embodiment of the present invention.

FIG. 9 is a schematic structural diagram of an electrode plate 500 for a wound lithium-ion battery according to another embodiment of the present invention. Referring to FIG. 9, the electrode plate 500 in this embodiment includes an electrode plate body 510, and there are 14 tabs 520, which are divided into two groups, on the electrode plate body 510. There are 10 tabs in the first group G1, and there are 4 tabs in the second group G2. The 10 tabs in the first group G1 are divided into 5 pairs. The widths of the 2 tabs in each pair are equal. The widths of the tabs of the adjacent two tab pairs are increased by 0.7 mm. The interval between two adjacent tab pairs is 29.2 mm, and the interval between the two tabs in each pair is 5.6 mm. In order to ensure the continuity of production, the width of the last tab in the first group G1 is narrower than that of another tab in that pair. The 4 tabs in the second group G2 are divided into 2 pairs. The widths of the two tabs in each pair are equal. The widths of the tabs of the adjacent two tab pairs are increased by 0.7 mm. The interval between two adjacent tab pairs is 32.7 mm, and the interval between the two tabs in each pair is 9 mm. In order to ensure the continuity of production, the width of the last tab in the second group G2 is narrower than that of another tab in that pair.

Referring to FIG. 9, the electrode plate 500 in this embodiment includes an electrode plate body 510, and there are 14 tabs 520, which are divided into two groups, on the electrode plate body 510. There are 10 tabs in the first group G1, and there are 4 tabs in the second group G2.

The 10 tabs in the first group G1 are divided into 5 pairs. The widths of the 2 tabs 520 in each pair are equal. The widths of the tabs of the adjacent two tab pairs are increased by $\pi\Delta t=0.7$ mm, where $\Delta t=0.223$ mm. The interval G12 between the adjacent two tab pairs is 29.2 mm, and the interval G11 between the two tabs 520 in each pair is 5.6 mm. In order to ensure the continuity of production, the width of the last tab 520a in the first group G1 is narrower than that of another tab 520b in that pair.

The 4 tabs in the second group G2 are divided into 2 pairs. The widths of the 2 tabs 520 in each pair are equal. The width of the tabs of the adjacent two tab pairs are increased by $\pi\Delta t=0.7$ mm, where $\Delta t=0.223$ mm. The interval G22 between the adjacent two tab pairs is 32.7 mm, and the interval G21 between the two tabs 520 in each pair is 9 mm. In order to ensure the continuity of production, the width of the last tab 520c in the second group G2 is narrower than that of another tab 520d in that pair.

When manufacturing the electrode plate 500 shown in FIG. 9, the manufacturing method of the preferred embodiment shown in FIG. 7 can be referred to. Different from the electrode plate 300 in the preferred embodiment shown in FIG. 7, the electrode plate 500 has two groups of tabs. Therefore, when manufacturing the electrode plate 500, two groups of cutting dies are required, where each group of cutting dies includes two cutting dies. The lengths of the two cutting dies in the first group of cutting dies respectively correspond to the interval G11 between the two tabs in the first group G1 and the interval G12 between the two adjacent tab pairs. The lengths of the two cutting dies in the second group of cutting dies respectively correspond to the interval G21 between the two tabs in the second group G2 and the interval G22 between the two pairs of adjacent tabs. When the electrode plate is die-cut to obtain the electrode plate 500 shown in FIG. 9, the electrode plate is die-cut by the two groups of cutting dies in order.

Figure 10:
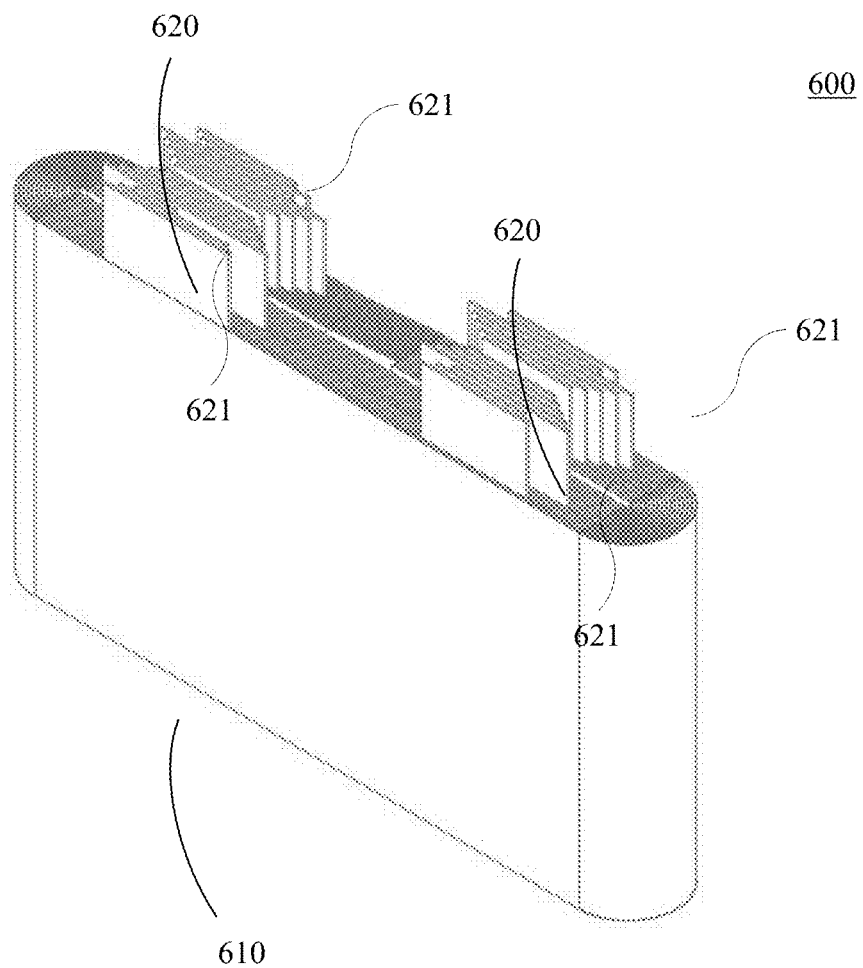
FIG. 10 is a schematic structural diagram of a cell of a lithium-ion battery formed by winding the electrode plate shown in FIG. 9.

FIG. 10 is a schematic structural diagram of a cell of a lithium-ion battery 600 formed by winding the electrode plate 500 shown in FIG. 9. Referring to FIG. 10, the cell 600 in this embodiment includes a cell body 610 and two electrodes 620. Each of the electrodes 620 comprises two half electrodes 621 disposed opposite of each other. There is an interval between the two half electrodes 621 which are mirror-symmetrical. The cell body 610 is wound by the electrode plate body 510, and the half electrode 621 is wound by the tab 520. In the half electrode 621, the widths of the tabs in each group sequentially decreased from the outer ring to the inner ring of the cell, and the tabs are centrally symmetrical. After that group is wound up, the widths of the repeated tabs in the next group sequentially decreases from the outer ring to the inner ring, and the tabs are centrally symmetrical. Referring to FIG. 10, the cell 600 in this embodiment includes a cell body 610 and two electrodes 620. The cell body 610 is wound by the electrode plate body 510. It can be understood that the two electrodes 620 are anode and cathode, respectively. There is certain interval between the two electrodes 620 to ensure that the anode and cathode of the cell 600 are out of a range of safe interval. Each of the electrodes 620 comprises two half electrodes 621 disposed opposite of each other.

The half electrode 621 is wound by the tab 520. In the half electrode 621 wound by a group of tabs, the widths of the tabs are sequentially increased from the inner ring to the outer ring of the cell 600. When one group of tabs has been wound, the next group of tabs will be wound right next to the first group of tabs. Since the width of the first tab in the next group is smaller than the width of the last tab in the previous group, the widths of the tabs are reduced first and then increased on the half electrode 621. The purpose of this design is to ensure that the interval between the two electrodes 620 of the cell 600 is within a range of safe interval.

It can be understood that when the electrode plate 500 has more than two groups of tabs 520, in the two electrodes 620 of the cell 600 wound by the electrode plate 500, the widths of tabs are sequentially increased from the inner ring to the outer ring of the cell body 610 for each group of tabs 520. After one group of the tabs 520 is completely wound, the widths of the next group of the tabs 520 will be reduced first, and then increased from the inner ring to the outer ring of the cell body 610, until the electrode plate 500 is completely wound.

Figure 11:
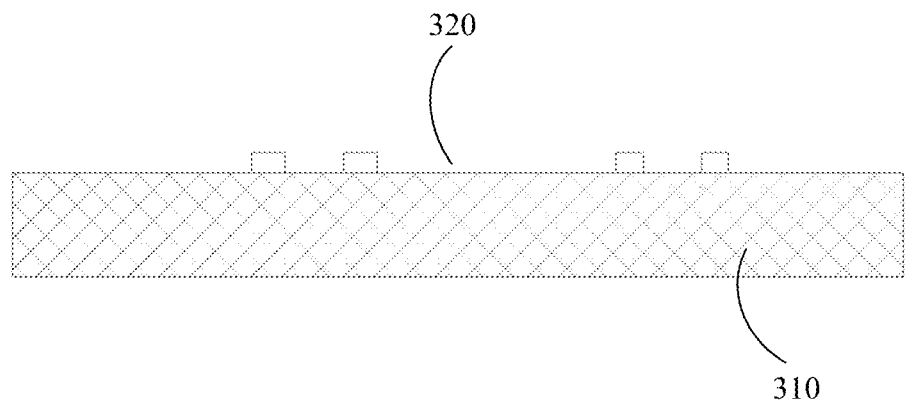
FIG. 11 is a schematic diagram of a coating structure of an electrode plate for a wound lithium-ion battery according to an embodiment of the present invention.

FIG. 11 is a schematic diagram of a coating structure of an electrode plate for a wound lithium-ion battery according to an embodiment of the present invention.

In the prior art shown in FIG. 1, the insulating layer 13 needs to be coated, and a sharp step 12 is formed. The present invention coats the active material on the electrode plate completely. FIG. 11, using the electrode plate 300 as shown in FIG. 7 as an example, shows that the electrode plate body 310 may be completely coated by an active material and has a high energy density and no sharp steps, reduces the self-discharge rate and improves safety. Correspondingly, the electrode plate in other embodiments can also be completely coated by an active material.

This application uses specific words to describe embodiments of this application. For example, "an embodiment", "one embodiment", and/or "some embodiments" means a certain feature, structure, or characteristic related to at least one embodiment of the present application. Therefore, it should be emphasized and noted that the "an embodiment" or "one embodiment" or "an alternative embodiment" mentioned two or more times in different places in this specification does not necessarily mean the same embodiment. In addition, certain features, structures, or characteristics in one or more embodiments of the present application may be appropriately combined.

Although the present invention has been described with reference to the current specific embodiments, those skilled in the art should recognize that the above embodiments are only used to illustrate the present invention, and various equivalent changes or substitutions can be made without departing from the spirit of the present invention. Therefore, as long as the changes and modifications to the above embodiments are within the scope of the essential spirit of the present invention, they will fall within the scope of the claims of the present application.

The invention claimed is:

1. An electrode plate for a wound lithium-ion battery, comprising: an electrode plate body and at least two groups of tabs which are set on the electrode plate body, wherein each group has a plurality of tabs, wherein an interval between the plurality of tabs is equal, wherein widths of the plurality of tabs are sequentially increased by $2\pi\Delta t$, and wherein $\Delta t$ is a sum of thicknesses of a positive electrode plate, a negative electrode plate and two layers of a separator of a cell of the lithium-ion battery.

2. The electrode plate of claim 1, wherein an interval between adjacent tabs in any first group of tabs from the at least two groups of tabs is equal to an interval between adjacent tabs in a second group of tabs from the at least two groups of tabs.

3. The electrode plate of claim 1, wherein an interval between adjacent tabs in any first group of tabs from the at least two groups of tabs is not equal to an interval between adjacent tabs in a second group of tabs from the at least two groups of tabs.

4. The electrode plate of claim 1, wherein a surface of the electrode plate is completely coated with an active material.

5. The electrode plate of claim 1, wherein a numerical number of tabs in each group of tabs in the at least two groups of tabs is 3-36.

6. The electrode plate of claim 1, wherein an interval between adjacent tabs in each group of the at least two groups of tabs is 10 mm~400 mm.

7. The electrode plate of claim 1, wherein a width of a last tab in the at least two groups of tabs is equal to a width of a third tab from the last tab in the at least two groups.

8. The electrode plate of claim 1, wherein a width of a last tab, which is adjacent to a next group of tabs, in each group of tabs is equal to a width of a third tab from the last tab in this group.

9. A cell wound by the electrode plate according to claim 1, comprising: a cell body and two electrodes, wherein the cell body is wound by the electrode plate body, and wherein each of the electrode is formed by sequentially stacking the at least two groups of tabs of each of the electrode plate.

10. The cell of claim 9, wherein a width of each tab of each group of tabs in each electrode is sequentially increased from the inner ring to the outer ring of the cell body.

11. The cell of claim 9, comprising: a positive electrode plate and a negative electrode plate, wherein the cell body comprises the electrode plate bodies of the positive electrode plate and the negative electrode plate, and wherein at least two groups of tabs of the positive electrode plate and at least two groups of tabs of the negative electrode plate are stacked separately to form one electrode.

12. The cell of claim 11, further comprising two layers of a separator stacked between the positive electrode plate and the negative electrode plate.

13. A method of manufacturing the electrode plate according to claim 1, wherein at least two cutting dies are used for die-cutting the electrode plate body to obtain the at least two groups of tabs, and wherein a length of each cutting die is equal to an interval between two adjacent tabs in a corresponding group of tabs.

14. An electrode plate for a wound lithium-ion battery, comprising: an electrode plate body and at least one group of tabs which is set on the electrode plate body, wherein each group has a plurality of tab pairs, wherein widths of two tabs of each tab pair in the plurality of tab pairs are equal, wherein an interval between two tabs in each tab pair is equal, wherein an interval between each tab pair is equal and widths of the tabs are sequentially increased by $\pi\Delta t$, and wherein $\Delta t$ is a sum of thicknesses of a positive electrode plate, a negative electrode plate and two layers of a separator of a cell of the lithium-ion battery.

15. The electrode plate of claim 14, wherein an interval L1 between two tabs in each tab pair is 5 mm≤L1≤280 mm.

16. The electrode plate of claim 14, wherein an interval L2 between each tab pair is 5 mm≤L2≤280 mm.

17. The electrode plate of claim 14, wherein a surface of the electrode plate body is completely coated with an active material.

18. The electrode plate of claim 14, wherein widths of two tabs of a last tab pair in the at least one group of tabs are not equal.

19. The electrode plate of claim 14, wherein widths of a last tab pair, which is adjacent to a next group of tabs, in each group of tabs are not equal.

20. A cell wound by the electrode plate according to claim 14, comprising: a cell body and two electrodes, wherein the cell body is wound by the electrode plate body, and wherein each of the electrodes is formed by sequentially stacking the at least one group of tabs.

21. The cell of claim 20, wherein each of the electrodes comprises two half electrodes disposed opposite each other, wherein each of the half electrodes is stacked by one of each of the tab pairs, wherein widths of the tabs in each half electrode is sequentially increased from the inner ring to the outer ring of the cell, and wherein each of the half electrodes is centrally symmetrical.

22. A method of manufacturing the electrode plate according to claim 14, wherein two cutting dies are used for die-cutting the electrode plate body for each group of tabs to obtain the plurality of tab pairs, wherein a length of one cutting die is equal to an interval between two tabs in the plurality of tab pairs, and wherein a length of another cutting die is equal to an interval between each tab pair.

23. A lithium-ion battery, comprising the cell of claim 9.

24. A lithium-ion battery, comprising the cell of claim 20.

\* \* \* \* \*